United States Patent [19]

Chyou et al.

[11] Patent Number: 5,557,918
[45] Date of Patent: Sep. 24, 1996

[54] GAS TURBINE AND METHOD OF OPERATING IT

[75] Inventors: Yau-Pin Chyou, Taipei, Taiwan; Thomas Sattelmayer, Mandach, Switzerland; Peter Senior, Sheffield, Great Britain

[73] Assignee: ABB Research Ltd., Zurich, Switzerland

[21] Appl. No.: 414,810

[22] Filed: Mar. 31, 1995

[30]    Foreign Application Priority Data

Jun. 3, 1994 [DE] Germany ............... 44 19 338.6

[51] Int. Cl.⁶ .................................................. F02C 3/14
[52] U.S. Cl. ......................... 60/39.04; 60/39.17; 60/757
[58] Field of Search ................. 60/39.04, 39.161, 60/39.162, 39.17, 740, 751

[56]                References Cited

U.S. PATENT DOCUMENTS 3,030,774  4/1962  Hennibg et al. .................. 60/740
3,054,257  9/1962  Schelp ............................ 60/39.17
3,204,406  9/1965  Howes ............................. 60/39.17

FOREIGN PATENT DOCUMENTS 0402693  12/1990  European Pat. Off. .
273506   6/1951   Switzerland .

Primary Examiner—Louis J. Casaregola
Attorney, Agent, or Firm—Burns, Doane, Swecker, & Mathis

[57]               ABSTRACT

A gas turbine apparatus for higher pressure and temperature ratio operation, improved thermal efficiency and minimized $NO_x$ emissions includes a high pressure compressor, a high pressure turbine, a low pressure turbine and combustion chambers for each of the turbines. A diffuser guides exhaust gas from the high pressure turbine and retards the velocity of the gases. A 180° bend downstream of the diffuser changes the flow direction of the gases. Fuel lances extend into the bend at the outlet end to inject fuel into the gases after the direction change. The bend directs the gas and fuel into a reversal combustion chamber where the gases and fuel again changes direction by 180°, and a ring vortex in the flow is produced. The fuel and air is ignited and combusted, and the combusted gases directed into the low pressure turbine.

7 Claims, 2 Drawing Sheets

GAS TURBINE AND METHOD OF OPERATING IT

BACKGROUND OF THE INVENTION

1. Field of the Invention

The invention relates to gas-turbine systems having two combustion chambers which are arranged in succession and are connected to a high-pressure turbine and a low-pressure turbine respectively.

2. Discussion of Background

An important aim of development in the power station sector is to increase the thermal efficiency. This aim can be achieved in both pure gas-turbine power stations and so-called combined power stations consisting of gas and steam turbines by improving the thermodynamic gas-turbine process.

CH-A-273 506 discloses a gas-turbine system which essentially consists of a first combustion chamber, a high-pressure turbine connected to the first combustion chamber, a second combustion chamber arranged downstream, and a low-pressure turbine connected to the latter. The exhaust gases of the first combustion chamber, after their expansion in the high-pressure turbine, are directed into the second combustion chamber, are heated again there by admixture of fuel, and are expanded again in the low-pressure turbine. Thus the thermal efficiency or else the actual power output is increased compared with gas turbines having only one combustion chamber.

However, more recent developments are directed toward increasing the pressure ratio in the high-pressure turbine and the inlet temperature of the exhaust gases directed into the second combustion chamber above hitherto conventional values. The known systems are not equipped for loads of this type. On account of the substantially higher inlet temperatures, a clear increase in the NOx-emissions would occur in the gas turbines used hitherto. In addition, a correspondingly high recovery of kinetic energy of the exhaust gases from the high-pressure turbine is not guaranteed. A further disadvantage of such systems is their relatively large overall length, which results from the arrangement of the second combustion chamber and the low-pressure turbine connected to it. In addition, problems arise with the ignition of the combustion mixture on account of the high velocity of the exhaust gases injected into the second combustion chamber.

SUMMARY OF THE INVENTION

Accordingly, one object of the invention is to provide a novel gas turbine which is suitable for higher pressure and temperature ratios and in which the thermal efficiency is improved, the overall length is reduced, and the NOx-production is minimized. In addition, a method of operating the gas turbine is to be provided.

According to the invention this is achieved when, a diffuser leading into an exhaust-gas bend follows the high-pressure turbine. At least one fuel lance fastened in the pressure casing of the gas turbine reaches into the other end of the exhaust-gas bend. The second combustion chamber is designed as a reversal combustion chamber into which the exhaust-gas bend leads. It is connected to the low-pressure turbine via a nozzle.

During operation of the gas turbine, the velocity of the exhaust gases of the first combustion chamber is retarded after they are discharged from the high-pressure turbine and their flow direction is changed by 180°. The fuel is then injected in the same flow direction into the exhaust gases and mixed with them. The resulting combustion mixture is directed into the second combustion chamber, is swirled there, and is ignited and burnt, and the exhaust gas is finally expanded in the low-pressure turbine.

The advantages of the invention lie in the relatively quick and uniform premixing of the fuel injected into the exhaust-gas bend with the exhaust gas of the first combustion chamber and in the low-NOx combustion associated therewith of the resulting combustion mixture in the second combustion chamber. Such favorable premixing is only made possible by the combination of the diffuser with the exhaust-gas bend and by the correspondingly directed injection of the fuel at the end of the exhaust-gas bend. On account of the use of a reversal combustion chamber as second combustion chamber, the gas-turbine rotor and thus the overall length of the gas turbine is considerably shortened, which furthermore improves the rotor dynamics. In addition, a ring vortex is produced in the reversal combustion chamber, which ring vortex ensures longer retention times of the combustion mixture in this combustion chamber and thus stabilizes the combustion.

The sum of the improvements in the premixing and the combustion in the second combustion chamber results in an increase in the thermal efficiency of the gas turbine.

It is especially convenient when the diffuser has an area ratio of diffuser outlet to diffuser inlet greater than or equal to two. The exhaust gases of the high-pressure turbine are thereby retarded to such an extent that the self-ignition of the combustion mixture in the second combustion chamber takes place without problem. In addition, a relatively high recovery of kinetic energy of the exhaust gases occurs in the process.

Furthermore, it is advantageous when the diffuser is of slightly curved configuration. An especially effective retardation of the exhaust gases coming from the high-pressure turbine is thereby achieved.

Finally, each fuel lance is sheathed in the exhaust-gas bend, and the sheathing is connected to the cooling-air system of the pressure casing of the gas turbine. The fuel lances are thereby protected from the hot exhaust gases of the first combustion chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein two exemplary embodiments of the invention are shown with reference to a gas turbine having a reversal combustion chamber and a high-pressure turbine arranged upstream as well as a low-pressure turbine arranged downstream and wherein.

Only the elements essential for understanding the invention are shown. Elements of the system which are not shown are, for example, the high-pressure compressor and the first combustion chamber as well as the exhaust-gas casing of the gas turbine with exhaust-gas pipe and flue. The direction of flow of the working media is designated by arrows.

DESCRIPTION OF THE PREFERRED EMBODIMENTS

Figure 1:
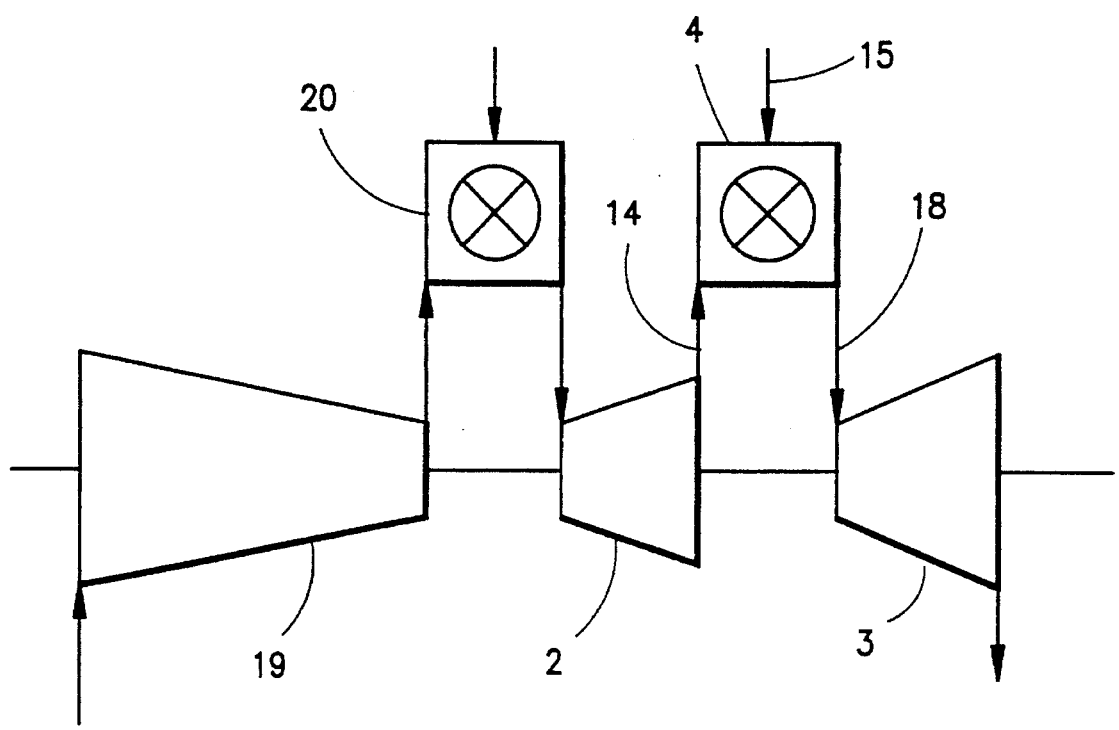
FIG. 1 is a schematic view of a gas turbine apparatus in accordance with the invention.
Figure 2:
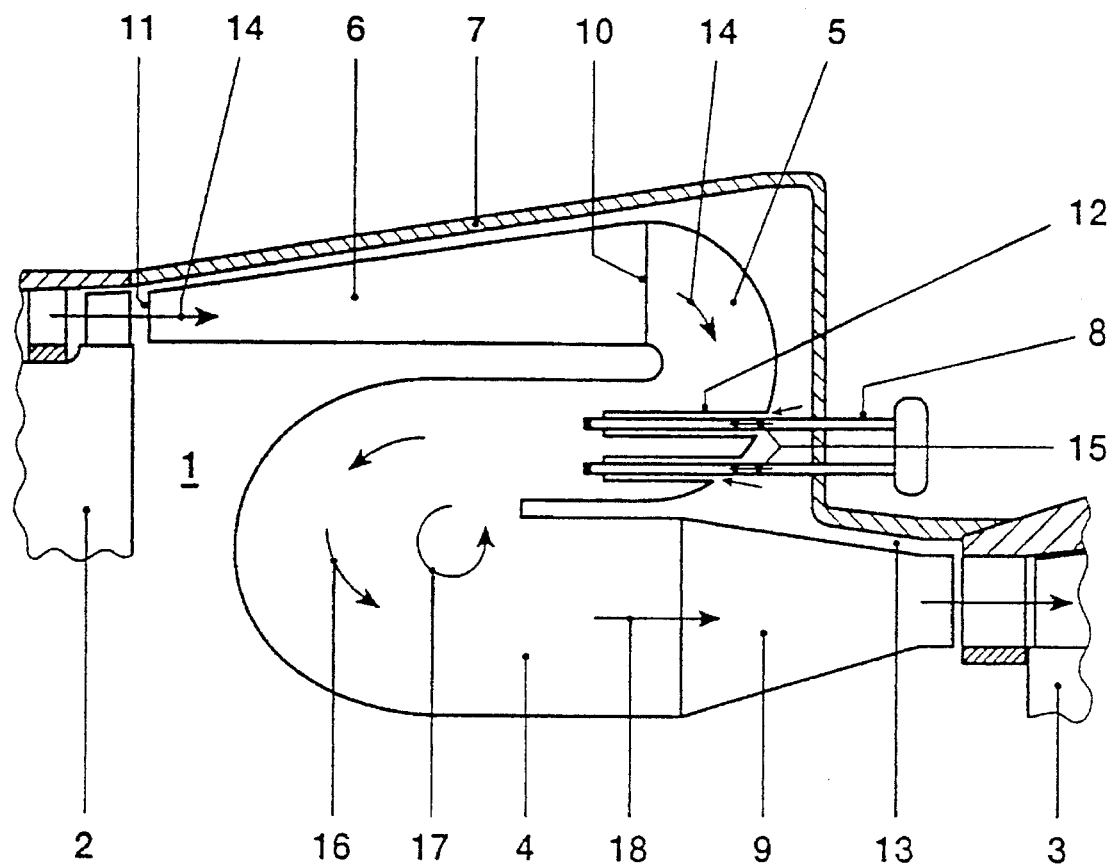
FIG. 2 is a partial longitudinal section of the gas turbine illustrating a reversal combustion chamber and a diffuser of straight configuration.

Referring now to the drawings, wherein like reference numerals designate identical or corresponding parts throughout the several views, the gas turbine 1 has a high-pressure compressor 19, a first combustion chamber 20, a high-pressure turbine 2 connected to the latter, and a second combustion chamber 4 connected to a low-pressure turbine 3. Following the high-pressure turbine 2 is a diffuser 6 of straight configuration which leads into an exhaust-gas bend 5. Two fuel lances 8 fastened in the pressure casing 7 of the gas turbine 1 reach into the other end of the exhaust-gas bend 5. The second combustion chamber 4 is designed as a reversal combustion chamber into which the exhaust-gas bend 5 leads. A nozzle 9 connected to the low-pressure turbine 3 follows the reversal combustion chamber 4 (as shown in FIG. 2).

The diffuser 6 has an area ratio of diffuser outlet 10 to diffuser inlet 11 greater than two. Both fuel lances 8 are designed to be sheathed in the exhaust-gas bend 5. The sheathing 12 is connected to the cooling-air system 13 of the pressure casing 7 of the gas turbine 1.

During operation of the gas turbine 1, the velocity of the exhaust gases 14 of the first combustion chamber is retarded in the diffuser 6 after they are discharged from the high-pressure turbine 2 and their flow direction is changed by 180° in the exhaust-gas bend 5. Fuel 15 is then injected in the same flow direction into the exhaust gases 14 and mixed with them. The resulting combustion mixture 16 is directed into the reversal combustion chamber 4 and thus the flow direction is again changed by 180°. Owing to this reversal of the flow direction, the combustion mixture 16 forms a ring vortex 17 which stabilizes the combustion in the reversal combustion chamber 4 taking place after the ignition. The resulting exhaust gas 18 is expanded in the low-pressure turbine 3.

Figure 3:
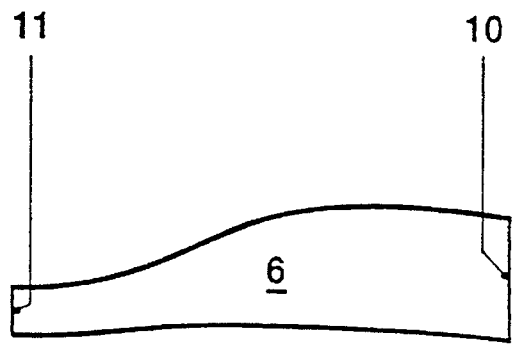
FIG. 3 shows a longitudinal section of the diffuser of slightly curved configuration.

In a second exemplary embodiment, the diffuser 6 is of slightly curved configuration (as shown in FIG. 3). It is thereby possible to retard the velocity of the exhaust gas 14 to a greater extent than with a diffuser 6 of straight configuration. All further sequences take place in a similar manner to the first exemplary embodiment.

The entire combustion-chamber configuration can also be of conical design to optimize the compressor and turbine diameters.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas turbine comprising:

a high-pressure compressor;

a high-pressure turbine;

a low-pressure turbine;

two combustion chambers arranged in sequence in a direction of flow, the first combustion chamber being connected to the high-pressure turbine and the second combustion chamber being connected via a nozzle to the low-pressure turbine;

a diffuser connected to receive exhaust gas from the high-pressure turbine;

an exhaust-gas bend connected at a first end to the diffuser, the exhaust gas bend being shaped to change the direction of flow of the gas for exit at a second end; and at least one fuel lance for injecting fuel into the exhaust gas fastened in a pressure casing of the gas turbine and extending toward the second end of the exhaust-gas bend; wherein the second combustion chamber is a reversal combustion chamber and is connected to the exhaust-gas bend, the second combustion chamber receiving the fuel and exhaust gas mixture from the exhaust gas bend and changing the direction of flow of the gas and fuel.

2. The gas turbine as claimed in claim 1, wherein the diffuser has an area ratio of diffuser outlet to diffuser inlet of at least two to one.

3. The gas turbine as claimed in claim 2, wherein the diffuser has straight walls between the inlet and outlet.

4. The gas turbine as claimed in claim 2, wherein the diffuser has walls that are curved between the inlet and outlet.

5. The gas turbine as claimed in claim 1, wherein a portion of said at least one fuel lance in the exhaust-gas bend is protected by a sheathing, and the sheathing is connected to the cooling-air system of the pressure casing of the gas turbine to provide cooling air for cooling said portion.

6. A method of operating a gas turbine having a high-pressure compressor, a high-pressure turbine, a low-pressure turbine, and a first combustion chamber connected to the high-pressure turbine and a second combustion chamber connected via a nozzle to the low-pressure turbine, comprising the steps of:

directing exhaust gases from the first combustion chamber into the high pressure turbine;

directing the exhaust gases from the high-pressure turbine into a diffuser where a velocity of the high-pressure turbine exhaust gases is reduced;

changing by 180° the direction of flow of the gases after exiting the diffuser;

injecting a fuel into the exhaust gases by an injection device for form a combustion mixture after the direction of flow of the gases is changed, directing the combustion mixture into the second combustion chamber, changing by 180° the direction of flow of the combustion mixture in the second combustion chamber, wherein a ring vortex is formed, igniting the combustion mixture in the second combustion chamber, and directing the combusting gases into the low-pressure turbine.

7. The gas turbine as claimed in claim 1, wherein the exhaust-gas bend is shaped to change the direction of flow by 180° and the second combustion chamber is shaped to change the flow direction by 180°.

\* \* \* \* \*